United States Patent
Oda

(10) Patent No.: US 12,170,368 B2
(45) Date of Patent: Dec. 17, 2024

(54) METHOD OF MANUFACTURING POSITIVE ELECTRODE ACTIVE MATERIAL FOR LITHIUM ION SECONDARY BATTERY

(71) Applicant: SUMITOMO METAL MINING CO., LTD., Tokyo (JP)

(72) Inventor: Shuhei Oda, Ehime (JP)

(73) Assignees: SUMITOMO METAL MINING CO., LTD., Tokyo (JP); Panasonic Energy Co., Ltd., Osaka (JP)

(*) Notice: Subject to any disclaimer, the term of this patent is extended or adjusted under 35 U.S.C. 154(b) by 675 days.

(21) Appl. No.: 17/310,690

(22) PCT Filed: Feb. 18, 2020

(86) PCT No.: PCT/JP2020/006368
§ 371 (c)(1),
(2) Date: Aug. 18, 2021

(87) PCT Pub. No.: WO2020/171093
PCT Pub. Date: Aug. 27, 2020

(65) Prior Publication Data
US 2022/0123295 A1    Apr. 21, 2022

(30) Foreign Application Priority Data

Feb. 21, 2019   (JP) .................................. 2019-029871

(51) Int. Cl.
*H01M 4/525*    (2010.01)
*C01G 41/00*    (2006.01)
(Continued)

(52) U.S. Cl.
CPC ............ *H01M 4/525* (2013.01); *C01G 41/00* (2013.01); *H01M 4/0471* (2013.01);
(Continued)

(58) Field of Classification Search
CPC ............................ C01G 41/00; H01M 4/0471
(Continued)

(56) References Cited

U.S. PATENT DOCUMENTS

| 8,962,195 B2 | 2/2015 | Shizuka et al. | |
| 2014/0186709 A1* | 7/2014 | Iwanaga | H01M 4/525 |
| | | | 429/223 |

(Continued)

FOREIGN PATENT DOCUMENTS

| CN | 107112529 | 8/2017 |
| JP | H11-016566 | 1/1999 |

(Continued)

OTHER PUBLICATIONS

International Search Report mailed on May 19, 2020 with respect to PCT/JP2020/006368.

*Primary Examiner* — Maria Laios
*Assistant Examiner* — Zackary Richard Cochenour
(74) *Attorney, Agent, or Firm* — IPUSA, PLLC

(57) ABSTRACT

A method of manufacturing a positive electrode active material for a lithium-ion secondary battery includes a water-washing step of washing a lithium-nickel composite oxide containing Li, Ni, and an element M with water, and conducting a filtration to form a washed-cake, a mixing step of mixing, while heating, the washed-cake and a tungsten compound without lithium while heating to obtain a tungsten mixture, and a heat treatment step of heat-treating the tungsten mixture, wherein a water content of the washed-cake is 3.0% by mass or more and 10.0% by mass or less, a ratio of a number of tungsten atoms contained in the tungsten mixture to a total number of nickel and the element M atoms contained in the lithium-nickel composite oxide is 0.05 at. % or more and 3.00 at. % or less, and a temperature of the mixing step is 30° C. or higher and 70° C. or lower.

8 Claims, 5 Drawing Sheets

(51) Int. Cl.
   *H01M 4/04*     (2006.01)
   *H01M 4/1391*   (2010.01)
   *H01M 4/36*     (2006.01)
   *H01M 4/88*     (2006.01)
   *H01M 4/02*     (2006.01)

(52) U.S. Cl.
   CPC ......... *H01M 4/1391* (2013.01); *H01M 4/366* (2013.01); *H01M 4/8882* (2013.01); *H01M 2004/028* (2013.01)

(58) Field of Classification Search
   USPC ....................................................... 429/209
   See application file for complete search history.

(56) References Cited

U.S. PATENT DOCUMENTS

2017/0352885 A1* 12/2017 Kondo .................. H01M 4/628
2019/0020023 A1*  1/2019 Yokoyama ............. H01M 4/62

FOREIGN PATENT DOCUMENTS

| JP | 2005-251716    | 9/2005  |          |
|----|----------------|---------|----------|
| JP | 2009-289726    | 12/2009 |          |
| JP | 2010-040383    | 2/2010  |          |
| JP | 2013-125732    | 6/2013  |          |
| JP | 2016-183090    | 10/2016 |          |
| JP | 2017-063003    | 3/2017  |          |
| JP | 2017-084628    | 5/2017  |          |
| JP | 2017084628 A * | 5/2017  | ............ C01G 41/00 |
| JP | 2017-117700    | 6/2017  |          |
| JP | 2017-117766    | 6/2017  |          |

* cited by examiner

METHOD OF MANUFACTURING POSITIVE ELECTRODE ACTIVE MATERIAL FOR LITHIUM ION SECONDARY BATTERY

TECHNICAL FIELD

The present invention relates to a method of manufacturing a positive electrode active material for a lithium ion secondary battery.

In recent years, with the spread of portable electronic devices such as cellular phones and notebook PCs, there is a strong need for the development of small, lightweight, lithium ion secondary batteries with high energy density. In addition, the development of high-output secondary batteries for electric vehicles such as hybrid vehicles is strongly desired.

Lithium ion secondary batteries have been proposed as secondary batteries that satisfy such requirements. Such lithium ion secondary battery is configured by, for example, a negative electrode, a positive electrode and an electrolyte, or the like. As active materials of the negative electrode and the positive electrode, materials that can intercalate and de-intercalate lithium ions are used.

Such lithium ion secondary batteries are currently being extensively researched and developed. Among them, lithium ion secondary batteries that use layered or spinel-type lithium-nickel composite oxide as a positive electrode material are capable of obtaining high voltages of 4V class, and thus have being practically used as batteries with high energy density.

As materials have been mainly proposed, a lithium-cobalt composite oxide ($LiCoO_2$), which is relatively easy to synthesize, a lithium-nickel composite oxide ($LiNiO_2$), which uses nickel that is less expensive than cobalt, a lithium-nickel-cobalt-manganese composite oxide ($LiNi_{1/3}Co_{1/3}Mn_{1/3}O_2$), a lithium-manganese composite oxide ($LiMn_2O_4$), which uses manganese, and the like are used.

Of these, lithium-nickel composite oxides are attracting attention as a material with good cycle characteristics, low resistance, and high output. For the positive electrode active material for lithium ion secondary batteries, low resistance required for high power output in lithium-ion secondary batteries has been important in recent years.

For example, as methods of realizing the above low resistance, addition of a different element is used, and a transition metal capable of obtaining a high valence number such as W, Mo, Nb, Ta, Re, or the like is particularly useful.

For example, Patent Document 1 proposes a lithium transition metal compound powder for a lithium secondary battery positive electrode material in which at least one element selected from Mo, W, Nb, Ta, and Re satisfy a predetermined composition formula and contain 0.1% by mole or more and 5% by mole or less of the total mole amount of Mn, Ni, and Co in the composition formula. In addition, Patent Document 1 discloses a method of manufacturing a lithium transition metal compound powder for a positive electrode material of a lithium secondary battery including a spray-drying step of pulverizing lithium carbonate, a Ni compound, a Mn compound, a Co compound, and a metal compound containing at least one element selected from Mo, W, Nb, Ta, and Re in a liquid medium and spray-drying the slurry uniformly dispersed therein, and a firing step of firing the resulting spray-dried product.

According to Patent Document 1, cost reduction, safety improvement, high load characteristics, and improved powder handling of lithium transition metal compound powder for the positive electrode material of a lithium secondary battery can be achieved when the lithium transition metal compound powder is used for the positive electrode material of a lithium secondary battery.

However, according to the above-described manufacturing method disclosed in Patent Document 1, the lithium transition metal compound powder is obtained by pulverizing the raw material in a liquid medium, spray-drying the slurry uniformly dispersed therein, and firing the resulting spray-dried product. Therefore, there is a problem that some of the heterogenous elements such as Mo, W, Nb, Ta, and Re are replaced with Ni which is disposed in a layer, and the battery characteristics such as the capacity and the cycle characteristics of the battery are reduced.

In addition, Patent Document 2 proposes a positive electrode active material for a non-aqueous secondary battery having at least a layered structure of a lithium transition metal composite oxide, wherein the lithium transition metal composite oxide exists in the form of particles consisting of one or both of primary particles and secondary particles that are aggregates of the primary particles, and wherein at least one type of compound is selected from the group consisting of molybdenum, vanadium, tungsten, boron, and fluorine on at least surface of the particles. In addition, Patent Document 2 discloses a method of manufacturing the positive electrode active material for a non-aqueous electrolyte secondary battery by firing and pulverizing a raw material mixture which is a mixture of a compound obtained by heat-treating after an additive element such as a molybdenum compound, a lithium compound, and a cobalt compound obtained are co-precipitated.

According to the positive electrode active material for the non-aqueous electrolyte secondary battery disclosed in Patent Document 2, in particular, the initial characteristics are improved without losing the improvement of thermal stability, load characteristics, and output characteristics, by having a compound having at least one selected from the group consisting of molybdenum, vanadium, tungsten, boron, and fluorine on the surface of the particles.

However, in Patent Document 2, the effect of at least one additive element selected from the group consisting of molybdenum, vanadium, tungsten, boron, and fluorine is said to be an improvement in the initial characteristics, that is, the initial discharge capacity and the initial efficiency, and not an improvement in the output characteristics. In addition, according to the manufacturing method disclosed in Patent Document 2, since a raw material mixture is a mixture of a compound obtained by heat-treating after the additive element such as the molybdenum compound, the lithium compound, and cobalt and the like are co-precipitated, a portion of the additive element is replaced with the layer of nickel, resulting in a problem of a deterioration of the battery characteristics.

In addition, Patent Document 3 proposes a positive electrode active material which is heat-treated by coating a tungsten oxide compound to composite oxide particles having a predetermined composition, and the amount of carbonate ion is 0.15% by mass or less. In addition, Patent Document 3 discloses a method of manufacturing a positive electrode active material including a deposition step in which the tungsten oxide compound is deposited on a composite oxide particle including lithium (Li) and nickel (Ni) and a heating step in which the composite oxide particle having the tungsten oxide compound is heated.

According to Patent Document 3, a gas generation due to decomposition of a non-aqueous electrolyte solution can be suppressed. Alternatively, a gas generation from the positive electrode active material itself can be suppressed. However, the positive electrode active material did not improve the output characteristics.

In addition, improvements have also been made with regard to the higher output of lithium-nickel composite oxides.

For example, Patent Document 4 discloses a lithium metal composite oxide consisting of primary particles and secondary particles composed of aggregation of primary particles. A positive electrode active material for non-aqueous electrolyte secondary batteries having fine particles containing lithium tungstate represented by any one of $Li_2WO_4$, $Li_4WO_5$, or $Li_6W_2O_9$ on the surface of its lithium metal composite oxide has been proposed, and it is said that high output as well as high capacity can be obtained.

However, although highly output is realized while the capacity is maintained, further high capacity has been demanded.

In Patent Document 5, Patent Document 5 discloses a method of manufacturing a positive electrode active material of a non-aqueous electrolyte secondary battery, including a mixing step of mixing lithium-nickel composite oxide particles, a tungsten compound powder without lithium, and water to obtain a tungsten mixture; a first heat-treatment step of heat-treating the tungsten mixture, and forming a lithium-nickel composite oxide particles in which tungsten is dispersed on the surface of primary particles by heat-treating the tungsten mixture in the heat-treatment step, and dissolving the tungsten compound particles by reacting the tungsten compound particles with the lithium compound present on the surface of primary particles of the lithium-nickel composite oxide particles; and a second heat-treatment step of forming lithium-nickel composite oxide particles with tungsten and lithium-containing compounds on the surface of the primary particles of the lithium-nickel composite oxide particles by heat treatment at a temperature higher than the first heat treatment step, which is performed next to the first heat treatment step.

PRIOR ART DOCUMENTS

Patent Document

Patent Document 1: Japanese Patent Application Laid-Open No. 2009-289726
Patent Document 2: Japanese Patent Application Laid-Open No. 2005-251716
Patent Document 3: Japanese Patent Application Laid-Open No. 2010-40383
Patent Document 4: Japanese Patent Application Laid-Open No. 2013-125732
Patent Document 5: Japanese Patent Application Laid-Open No. 2017-063003

SUMMARY OF THE INVENTION

Problems to be Solved by the Invention

However, in the embodiment of Patent Document 5, only an example in which a mixed powder of the tungsten mixture is placed in an aluminum bag and nitrogen gas purged in the first heat treatment step is disclosed, and when the method is applied to mass production, there is a problem that the cost becomes very high.

In Patent Document 5, the mixing step, the first heat treatment step, and the second heat treatment step are required, and many steps are required. This also increases the manufacturing cost. Furthermore, the use of an aluminum bag or a vacuum dryer prevents the continuous processing of mixing and heat treatment, which is also disadvantageous in terms of cost.

In view of the problems of the above-described prior art, one aspect of the present invention is to provide a method of manufacturing a positive electrode active material for a lithium ion secondary battery capable of obtaining the positive electrode active material at a low cost, and capable of obtaining the positive electrode active material with high capacity and high output when used for a positive electrode of a lithium ion secondary battery.

Means for Solving the Problems

In order to solve the above problems, according to one aspect of the present invention, a method of manufacturing positive electrode active material for a lithium ion secondary battery includes a water-washing step includes a lithium-nickel composite oxide containing lithium (Li), nickel (Ni), and an element M (M) (wherein, the element M is at least one element selected from Mn, V, Mg, Mo, Nb, Ti, Co, and Al) being washed with water, and conducting a filtration to form a washed cake; a mixing step of mixing, while heating, the washed cake and a tungsten compound without lithium to obtain a tungsten mixture; and a heat treatment step of heat-treating the tungsten mixture, wherein a water content of the washed cake is 3.0% by mass or more and 10.0% by mass or less, a ratio of a number of tungsten atoms contained in the tungsten mixture to a total number of nickel and the element M atoms contained in the lithium-nickel composite oxide is 0.05 at. % or more and 3.00 at. % or less, and a temperature of the mixing step is 30° C. or higher and 70° C. or lower.

Effects of the Invention

According to one aspect of the present invention, a method of manufacturing a positive electrode active material for a lithium ion secondary battery capable of obtaining the positive electrode active material at a low cost, and capable of obtaining the positive electrode active material with high capacity and high output when used for a positive electrode of a lithium ion secondary battery can be provided.

DETAILED DESCRIPTION OF THE INVENTION

Figure 1:
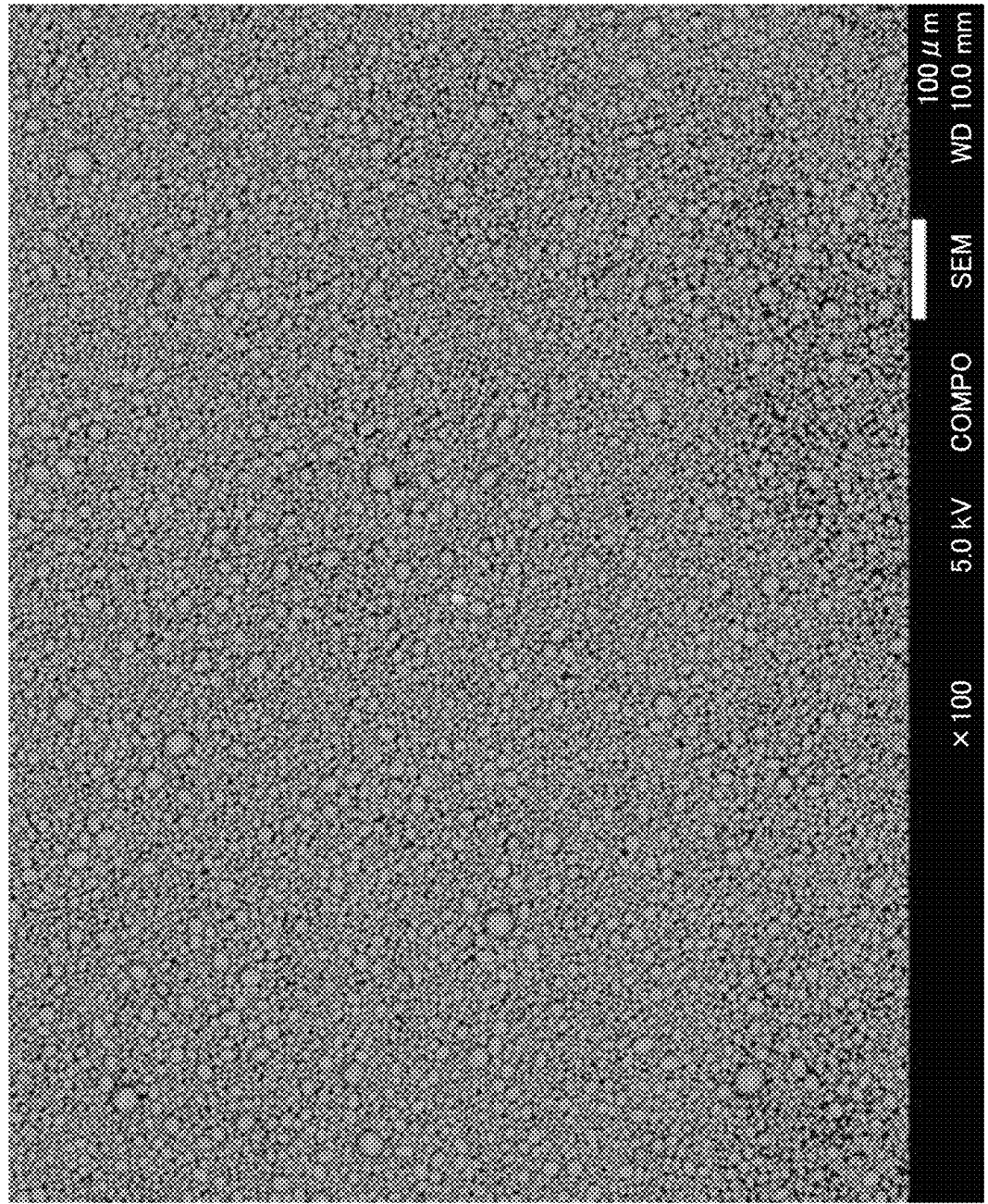
FIG. 1 is an example of an SEM image when measuring segregated particles.

While embodiments of the present invention will now be described with reference to the accompanying drawings, the present invention is not limited to the following embodiments, and various modifications and substitutions can be made to the following embodiments without departing from the scope of the present invention.

[Method of Manufacturing Positive Electrode Active Material for Lithium Ion Secondary Battery]

The method of manufacturing the positive electrode active material for a lithium ion secondary battery according to the present embodiment (hereinafter, also referred to as "method of manufacturing a positive electrode active material") can include the following steps.

A water-washing step includes a lithium-nickel composite oxide containing lithium (Li), nickel (Ni), and an element M (M) (wherein the element M is at least one element selected from Mn, V, Mg, Mo, Nb, Ti, Co, and Al) being washed with water, filtered, and formed into a washed cake.

A mixing step includes mixing the washed cake and a tungsten compound without lithium while heating to obtain a tungsten mixture.

A heat treatment step includes heat-treating the tungsten mixture.

In addition, a ratio of a number of tungsten atoms contained in the tungsten mixture to a total number of nickel and the element M atoms contained in the lithium-nickel composite oxide is preferably 0.05 at. % or more and 3.00 at. % or less.

The temperature of the mixing step can be 30° C. or higher and 70° C. or lower.

Hereinafter, the method of manufacturing the positive electrode active material for a lithium ion secondary battery is described in detail for each step.

(Water-Washing Step)

In the water-washing step, the lithium-nickel composite oxide can be washed with water, filtered, and formed into a washed wake.

In the water-washing step, excess lithium component attached to the surface of the particles and impurity elements that cause battery characteristics to deteriorate from the lithium-nickel composite oxide can be reduced or removed by washing the lithium-nickel composite oxide with water. In addition, by adjusting the degree of dewatering after the water-washing step, the necessary water content can be imparted to the lithium-nickel composite oxide to promote the reaction between the lithium compound present on the surface of the primary particles of the lithium-nickel composite oxide and the tungsten compound in a mixing step described below.

In the water-washing step, for example, the lithium-nickel composite oxide is added to water to form a slurry, and the slurry is stirred to wash the lithium-nickel composite oxide (water washing). After washing with water, the slurry can be filtered to separate the lithium-nickel composite oxide, which is a washed cake, from the filtrate.

The lithium-nickel composite oxide provided to the water-washing step can contain lithium (Li), nickel (Ni), and an element M (M) in an amount of substance ratio of Li:Ni:M=y:1−x:x. It should be noted that x and y preferably satisfy 0≤x≤0.70 and 0.95≤y≤1.20. In addition, the element M is at least one element selected from Mn, V, Mg, Mo, Nb, Ti, Co, and Al. Then, the lithium-nickel composite oxide is preferably a compound having a layered structure, that is, a layered compound.

The lithium-nickel composite oxide can be represented by the general formula, for example, $Li_yNi_{1-x}M_xO_{2+\alpha}$. It should be noted that as x, y, and the element M have already been described, the explanations of these are omitted here. α is preferably, for example, −0.2≤α≤0.2.

The lithium-nickel composite oxide can be in the form of a powder, for example, with primary particles and secondary particles in which the primary particles are aggregated.

Although the water used in the water-washing step is not particularly limited, it is preferable to use pure water to prevent impurities from getting mixed in. Especially from the view point of preventing degradation of battery characteristics due to adhesion of impurities to the lithium-nickel composite oxide, water with an electrical conductivity of less than 10 µS/cm is more preferable, and water with an electrical conductivity of 1 µS/cm or less is even more preferable.

A lithium hydroxide can be added to the water used to form a slurry in order to reduce the slurry concentration and improve the handling of the slurry while preventing adverse effects on the battery characteristics. When the lithium hydroxide is added to the water used to form the slurry, it is preferable to adjust the amount of lithium hydroxide added so that the conductivity of the filtrate obtained in the water-washing step is 40 mS/cm or more and 80 mS/cm or less.

Although the degree of washing of the lithium-nickel composite oxide in the water-washing step is not particularly limited, it is preferable to select the water-washing conditions, that is, the conditions for washing, so that the conductivity of the filtrate obtained after filtration in the water-washing step is 40 mS/cm or more and 80 mS/cm or less. The conditions for washing here include, for example, the concentration of the slurry obtained by adding the lithium-nickel composite oxide to water, the stirring time, the temperature of the slurry, and the like. The lithium compound can be prevented from being excessively washed away from the surface of the lithium-nickel composite oxide particles, by washing the filtrate so that the conductivity of the filtrate is 40 mS/cm or more. Accordingly, the lithium compound necessary for the reaction with the tungsten compound is disposed on the surface of the lithium-nickel composite oxide particles after the water-washing step, and a compound containing tungsten and lithium can be sufficiently formed in the mixing step described below, and the output characteristics can be particularly improved.

In addition, by washing the lithium-nickel composite oxide so that the conductivity of the filtrate is 80 mS/cm or less, the excess lithium component, which is more than the amount required to form the compound containing tungsten and lithium, can be properly removed from the surface of the lithium-nickel composite oxide particles, resulting in enhancing the battery characteristics.

The slurry concentration of the slurry in which the lithium-nickel composite oxide is dispersed in water when water washing is performed is not particularly limited, but the thinner the slurry concentration, the easier it is to reduce the conductivity of the filtrate. For example, the slurry concentration is preferably 750 g/L or more and 1500 g/L or less.

The temperature at the time of water washing, that is, the slurry temperature, is also not particularly limited, but the lower the temperature, the easier it is to reduce the conductivity of the filtrate. For example, the temperature is preferably 20° C. or higher and 30° C. or lower.

The washing time, that is, the time for stirring the slurry, is also not particularly limited, but the washing time is preferably 5 minutes or longer and 60 minutes or shorter. By applying the washing time of 5 minutes or longer, excess lithium components and impurities on the surface of the lithium-nickel composite oxide powder can be sufficiently removed. In contrast, increasing the washing time does not improve the cleaning effect and decreases the productivity. For this reason, the washing time is preferably 60 minutes or shorter, as described above.

After the slurry is stirred and washed for a predetermined time, the slurry can be filtered as described above to separate the lithium-nickel composite oxide which is the washed cake, from the filtrate. During filtration, dewatering can also be performed in conjunction with the filtration to adjust the water content of the wash cake as needed.

The water content of the washed cake obtained after washing in the water-washing step is not particularly limited, but is preferably 3.0% by mass or more and 10.0% by mass or less, more preferably 3.0% by mass or more and 7.0% by mass or less, and even more preferably 4.0% by mass or more and 6.0% by mass or less.

This is because setting the water content of the washed cake to 3.0% by mass or more can particularly promote the reaction between the lithium compound present on the surface of the primary particles of the lithium-nickel composite oxide and the tungsten compound in the mixing step described below. By promoting the reaction between the lithium compound and the tungsten compound, the particles of the compound containing tungsten and lithium can be sufficiently formed on the surface of the primary particles of the lithium-nickel composite oxide, and the output characteristics of a lithium ion secondary battery can be particularly enhanced when used for the positive electrode of the lithium ion secondary battery.

In contrast, when the water content of the washed cake is set to 10.0H by mass or less, it prevents the viscosity of the washed cake of lithium-nickel composite oxide from becoming high, and in the mixing step described below, the washed cake and the tungsten compound can be evenly mixed in particular, and the mixing time can be controlled.

(Mixing Step)

In the mixing step, the washed cake and the tungsten compound without lithium are mixed while heating, and a tungsten mixture, which is a mixture of the lithium-nickel composite oxide containing water content and the tungsten without lithium, can be obtained. It should ne noted that at least part of the tungsten compound in the mixing step, as described below, is thought to react with the excess lithium compound present on the surface of the primary particles of the lithium-nickel composite oxide to form the compound containing tungsten and lithium. Therefore, for this reason, the tungsten mixture can also contain compounds containing tungsten and lithium, either in place of or in addition to the tungsten compound.

The mixing step is preferably carried out without using in a closed container, such as an aluminum pouch and the like.

When mixed in the mixing step, an excess lithium compound present on the surface of primary particles of the lithium-nickel composite oxide is eluted into water. Therefore, when a tungsten compound that can be dissolved in a water-soluble or alkaline solution is used, dissolution of the tungsten compound and a dispersion of tungsten component can be processed in the mixing step.

In addition, the excess lithium compound present on the surface of the primary particles of the lithium-nickel composite oxide can be reacted with the tungsten compound by mixing the washed cake and the tungsten compound while heating. Then, the excess lithium compound present on the surface of the primary particle of the lithium-nickel composite oxide is reacted with the tungsten compound to dissolve the obtained compound containing tungsten and lithium in water and to disperse the compound containing tungsten and lithium on the surface of the primary particle of the lithium-nickel composite oxide.

The tungsten compound to be used penetrates into the surface of the primary particles inside the secondary particles of the lithium-nickel composite oxide. Therefore, the tungsten compound is preferably a water soluble which is able to dissolve in the water content contained in the tungsten mixture. In addition, the tungsten compound may also be a soluble compound in an alkaline state, since the water content in the tungsten mixture becomes alkaline by lithium elution. In addition, the tungsten mixture is heated in the mixing step. Even though the tungsten compound is difficult to dissolve in water at room temperature, tungsten compounds that dissolves in water when heated during the mixing step, or that reacts with lithium compounds on the surface of lithium-nickel composite oxide particles to form a compound containing tungsten and lithium that dissolves in water, can be suitably used.

Further, the dissolved tungsten compound should have enough amount to sufficiently penetrate to the surface of primary particles inside the secondary particles of lithium-nickel composite oxide. Therefore, for example, if the excess tungsten compound is added, some of it may be in a solid state after mixing or even heating.

Thus, the tungsten compound preferably does not contain lithium, and is preferably in a soluble state in water when heating in the mixing step. Although the tungsten compound without lithium used in the mixing step is not particularly limited, for example, one or more kinds selected from tungsten oxide, tungstic acid, ammonium tungstate, sodium tungstate, and the like are preferably used, and one or more kinds selected from tungsten oxide ($WO_3$) and tungstic acid ($WO_3 \cdot H_2O$) having a low possibility of contamination with impurities can be more preferably used.

The amount of tungsten contained in the tungsten mixture is not particularly limited. The tungsten compound is preferably added so that the number of tungsten atoms contained in the tungsten mixture to the total number of nickel and element M atoms contained in the lithium-nickel composite oxide is 0.05 at. % or more and 3.00 at. % or less, more preferably 0.05 at. % or more and 2.00 at. % or less, even more preferably 0.10 at. % or more and 1.00 at. % or less, and particularly preferably 0.10 at. % or more and 0.50 at. % or less.

When the amount of tungsten in the tungsten mixture is set within the above range, the amount of tungsten contained in the compound containing tungsten and lithium that formed on the surface of the lithium-nickel composite oxide particles in the obtained positive electrode active material can be within preferable range. Therefore, when the positive electrode active material is used for a positive electrode material for a lithium ion secondary battery, charge-discharge capacity and output characteristics can be particularly improved and both can be achieved.

It should be noted that the ratio of the number of tungsten atoms to the total number of nickel and element M atoms contained in the positive electrode active material obtained after the heat treatment step does not change. Therefore, the ratio of the number of tungsten atoms to the total number of nickel and element M atoms contained in the positive electrode active material obtained after the heat treatment step preferably falls within the same range of the aforementioned tungsten mixture.

In the mixing step, it is preferable to mix while heating in order to react the excess lithium compound present on the surface of primary particles of the lithium-nickel composite oxide with the tungsten compound, as described above. It should be noted that mixing while heating also allows the tungsten compound or the compound containing tungsten and lithium to be well dispersed on the surface of primary particles of the lithium-nickel composite oxide.

The heating temperature in the mixing step, that is, the mixing temperature, is not particularly limited. The mixing temperature in the mixing step is preferable, for example, is preferably 30° C. or higher and 60° C. or lower, more preferably 30° C. or higher and 60° C. or lower.

The temperature of the tungsten mixture may increase slightly due to the reaction between the tungsten compound and the lithium compound present on the surface of the lithium-nickel composite oxide particles during mixing. However, when the mixing temperature is set to 70° C. or lower, the tungsten compound can be uniformly dispersed in the lithium-nickel composite oxide particles while suppressing the decrease in water content in the tungsten mixture during the mixing step. In addition, by uniformly dispersing the tungsten compound, the excess lithium compound present on the surface of the primary particles of lithium-nickel composite oxide can be sufficiently reacted with the tungsten compound. However, if the mixing temperature is above 70° C., the drying of the tungsten mixture may not provide the necessary water content to promote the reaction between the lithium compound and the tungsten compound.

When the mixing temperature is 30° C. or higher, the dispersion of the tungsten compound can be especially promoted, and the reaction of the tungsten compound with the excess lithium compound can also be especially promoted.

The time for performing the mixing step is not particularly limited, and the mixing step can be arbitrarily selected depending on the mixing temperature and the like. The mixing time is preferably 5 minutes or longer and 30 minutes or shorter. When the mixing time is 5 minutes or longer, the dispersion of tungsten compound and the reaction of tungsten compound with excess lithium compound can particularly promoted. In addition, from the viewpoint of increasing productivity and reducing costs, the mixing time should be 30 minutes or shorter because even if the mixing time is excessively long, there is no significant difference in the degree of dispersion of the tungsten compound or in the degree of reaction between the tungsten compound and the excess lithium compound.

The atmosphere of the mixing step is not particularly limited, but in order to avoid reaction between carbon dioxide in the atmosphere and the lithium component on the surface of the lithium-nickel composite oxide particles, the atmosphere of the mixing step is preferably either decarboxylated air or an inert gas. Decarbonized air indicates an atmosphere in which the carbonic acid in the air, or the air which carbon dioxide has been decreased. Inert gas indicates an atmosphere with one or more gases selected from noble gas and nitrogen gas.

A general mixer may be used for mixing lithium-nickel composite oxide with a tungsten compound without lithium. For example, a shaker mixer, a Loedige mixer, a Julia mixer, a V-blender, or the like may be used to sufficiently mix to the extent that the form of the lithium-nickel composite oxide is not destroyed.

(Heat Treatment Step)

In the heat treatment step, the tungsten mixture can be heat-treated. In the heat treatment step, a water content in the tungsten mixture can be sufficiently evaporated to fix or immobilize the compound containing tungsten and lithium on the surface of the primary particles of the lithium-nickel composite oxide particles.

Although the heat treatment temperature in the heat treatment step is not particularly limited, the temperature is preferably 100° C. or higher and 200° C. or lower. This is because the water content in the tungsten mixture can be sufficiently evaporated, and the compounds containing tungsten and lithium can be well fixed onto the particle surface of the lithium-nickel composite oxide by setting the heat treatment temperature to 100° C. or higher.

In addition, by setting the heat treatment temperature at 200° C. or lower, it is possible to prevent the formation of necking between particles of lithium-nickel composite oxide through compounds containing tungsten and lithium, and the reduction of the specific surface area of lithium-nickel composite oxide particles. Therefore, when the obtained positive electrode active material is used as a material for the positive electrode of the lithium ion secondary battery, the battery characteristics can be particularly enhanced.

The heat treatment time of the heat treatment step is not particularly limited, but the time of the heat treatment step is preferably 1 hour or longer and 5 hours or shorter in order to sufficiently evaporate the water content to fix the compounds containing tungsten and lithium. In addition, it is preferable to increase the rate of temperature rise to 2° C./min or higher in order to extend the deceleration drying time for improved productivity.

The atmosphere in the heat treatment step is preferably either decarboxylated air or an inert gas in order to avoid the reaction of carbon dioxide in the atmosphere with lithium on the particle surface of the lithium-nickel composite oxide.

By conducting the heat treatment step, a compound containing tungsten and lithium, specifically, lithium tungstate for example, can be formed on the surface of the lithium-nickel composite oxide particles.

According to the method of manufacturing the positive electrode active material of the above-described embodiment, the tungsten compound can be uniformly dispersed in the particles of lithium-nickel composite oxide by mixing the washed cake obtained in the water-washing step with the tungsten compound without lithium while heating in the mixing step. In addition, the excess lithium compound present on the surface of the lithium-nickel composite oxide particles is reacted with the tungsten compound to form a compound containing tungsten and lithium, and can be uniformly dispersed. Then, by sufficiently evaporating the water content in the heat treatment step, the compound containing tungsten and lithium on the surface of the lithium-nickel composite oxide particles, such as lithium tungstate, can be uniformly fixed. Therefore, the proportion of segregated particles in which the compound containing tungsten and lithium is largely deposited than other particles on the surface of lithium-nickel composite oxide particles can be suppressed. By suppressing the proportion of segregated particles, the cycle characteristics can be improved and the positive electrode resistance can be suppressed.

In addition, by setting the amount of tungsten in the tungsten mixture formed in the mixing step to a predetermined range, the amount of tungsten contained in the compound containing tungsten and lithium formed on the surface of particles of the lithium-nickel composite oxide in the obtained positive electrode active material can be in a preferred range. Therefore, when the positive electrode active material obtained by the method of manufacturing the positive electrode active material of the present embodiment is used as a material of the positive electrode of the lithium ion secondary battery, the charge-discharge capacity and the output characteristics can be particularly improved and can be achieved at the same time. That is, high output with high capacity can be obtained.

Further, according to the method of manufacturing the positive electrode active material of the present embodiment, the desired positive electrode active material can be manufactured by the aforementioned water-washing step, mixing step, and the heat treatment step without the need for sealing the material in an aluminum container or the like. Therefore, a high capacity and a high output positive electrode active material at a low cost, as described above, can be obtained.

[Positive Electrode Active Material for Lithium Ion Secondary Battery]

Next, a configuration example of the positive electrode active material for a lithium ion secondary battery of the present embodiment (hereinafter, also referred to as "positive electrode active material") will be described. It should be noted that the positive electrode active material for the lithium ion secondary battery of the present embodiment can be manufactured by, for example, the manufacturing method of the aforementioned positive electrode active material, some of the matters described above will be omitted.

The positive electrode active material for a lithium ion secondary battery of the present embodiment can include a plurality of composite particles having particles of lithium-nickel composite oxide containing lithium (Li), nickel (Ni), and an element M (M) in an amount of substance ratio of Li:Ni:M=y:1−x:x, and a compound containing tungsten and lithium disposed on the surface of such lithium-nickel composite oxide particles.

The above-described x and y satisfy the requirements of $0 \leq x \leq 0.70$ and $0.95 \leq y \leq 1.20$, and the element M can be at least one element selected from Mn, V, Mg, Mo, Nb, Ti, Co, and Al.

In addition, a proportion of segregated particles in which the compound containing tungsten and lithium is disposed in a larger amount than the other composite particles on the surface of the lithium-nickel composite oxide particles among a plurality of the composite particles is 0.1% or less by number ratio. Further, the number ratio of tungsten contained in the compound containing tungsten and lithium with respect to the total number of nickel and element M atoms contained in the lithium-nickel composite oxide is preferably 0.05 at. % or more and 3.0 at. %.

The positive electrode active material of the present embodiment can have a plurality of composite particles having particles of the lithium-nickel composite oxide described above and a compound containing tungsten and lithium disposed on the surface of such lithium-nickel composite oxide particles. The positive electrode active material of the present embodiment may be composed of the above-described composite particles.

The lithium-nickel composite oxide can be represented, for example, by the general formula $Li_yN_{1-x}M_xO_{2+\alpha}$. The explanation of x, y, and element M has already been described, and is therefore omitted here. For example, α is preferably $-0.2 \leq \alpha \leq 0.2$. The lithium-nickel composite oxide can have, for example, a layered structure. That is, the lithium-nickel composite oxide can be a layered compound.

In addition, the particles of the lithium-nickel oxide composite can have primary particles and secondary particles in which the primary particles are aggregated.

A high charge-discharge capacity can be obtained by using such lithium-nickel composite oxide.

It is capable of having a structure in which a compound containing tungsten and lithium, for example, lithium tungstate, is disposed on the particle surface of the lithium-nickel composite oxide as described above.

In general, if the surface of the positive electrode active material is completely coated with heterogeneous compounds, the benefit such as high capacity of the lithium-nickel composite oxide may possibly be eliminated as a result of the significant limitation of lithium ion migration (intercalation). However, in the positive electrode active material of the present embodiment, a compound containing tungsten and lithium is formed on the surface of the particles of the lithium-nickel composite oxide, but the compound containing tungsten and lithium has excellent lithium ion conductivity and an effect of promoting lithium ion migration. Therefore, by disposing the compound containing tungsten and lithium on the surface of the particles of the lithium-nickel composite oxide, the conductive path of lithium can be formed at the interface with the electrolyte, and the reaction resistance of the positive electrode active material (hereinafter, sometimes referred to as "positive electrode resistance") can be reduced, thereby improving the output characteristics.

That is, a reduction in the positive electrode resistance reduces the voltage lost in the battery, and the voltage applied to the load side becomes relatively high, resulting in a high output. In addition, as the applied voltage to the load side increases, intercalation and de-intercalation of lithium is sufficiently performed at the positive electrode, thus improving the battery capacity. Furthermore, the cycle characteristics can be improved by reducing the reaction resistance, which also reduces the load of active material during charging and discharging.

By containing tungsten and lithium, such compound containing tungsten and lithium exerts excellent lithium ion conductivity and has the effect of promoting lithium ion migration. The specific composition of the compound is not particularly limited. However, the compound is preferably a lithium tungstate, for example, in terms of the ratio of the number of atoms, 50% or more of the tungsten contained in the compound containing tungsten and lithium is preferably present in the form of $Li_4WO_5$.

This is because $Li_4WO_5$ has more conductive paths of lithium ions than other compounds containing tungsten and lithium and is highly effective in promoting the migration of lithium ions. Thus, 50% or more of W is present in the form of $Li_4WO_5$ in the ratio of the number of atoms, the reduction effect in a higher reaction resistance can be obtained.

Here, the compound containing tungsten and lithium is more preferably formed on the surface of primary particles of the lithium-nickel composite oxide because a contact between the electrolyte and the lithium-nickel composite oxide occurs on the surface of primary particles of the lithium-nickel composite oxide.

The surface of primary particles of the lithium-nickel composite oxide in the present embodiment includes near the surface of the secondary particles where the electrolyte can penetrate through the surface of the primary particles exposed on the outer surface of the secondary particles and the outside of the secondary particles, and the surface of primary particles exposed to the internal voids. In addition, even grain boundaries between primary particles are included if the bonding between the primary particles is incomplete and the electrolyte is able to penetrate.

Therefore, the contact between the lithium-nickel composite oxide and the electrolyte occurs not only on the outer surface of the secondary particles, which are composed of aggregated primary particles of the lithium-nickel composite oxide, but also near the surface of the above secondary particles, in the internal voids, as well as at the above imperfect grain boundaries. For this reason, it is preferable to form and dispose the compound containing tungsten and lithium on the surface of the above primary particles as well to promote the migration of lithium ions.

Therefore, by forming the compound containing tungsten and lithium on many of the surfaces, for the surface of the primary particles of lithium-nickel composite oxide which is capable of contacting with the electrolyte, the reaction resistance of the lithium-nickel composite oxide particles can be further reduced.

The compound containing tungsten and lithium does not have to be disposed on the entire surface of the primary particles that are able to contact with the electrolyte, but can be in a partially covered state or in a scattered state. Even in a partially covered state or scattered state, if the compound containing tungsten and lithium is formed on the surface of primary particles that is able to contact with the electrolyte, the effect of reducing the positive electrode resistance can be obtained.

It is preferable that the particles of lithium-nickel composite oxide contained in the positive electrode active material of the present embodiment are uniformly formed with the compounds containing tungsten and lithium on the surface of the primary particles.

Here, the positive electrode active material includes a plurality of composite particles having particles of a lithium-nickel composite oxide and a compound containing tungsten and lithium disposed on the surface of the particles of the lithium-nickel composite oxide. It should be noted that the particles of the lithium-nickel composite oxide can include primary particles including the lithium-nickel composite oxide or secondary particles in which the primary particles are aggregated.

If compounds containing tungsten and lithium are not formed uniformly on the surface of the particles of the lithium-nickel composite oxide between the above-described composite particles, the migration of lithium ions between the composite particles becomes uneven, and a load is imposed on the specific composite particles, which may lead to deterioration of the cycle characteristics and an increase in the positive electrode resistance in the long term.

When the positive electrode active material of the present embodiment contains segregated particles and the positive electrode active material is observed under a scanning electron microscope (SEM), the other composite particles are gray, while the segregated particles are white. The segregated particle refers to a particle on which a compound containing tungsten and lithium is deposited and disposed more than other composite particles on the particle surface of the lithium-nickel composite oxide.

Therefore, the presence or absence of segregated particles, the number ratio of segregated particles, and the like can be calculated by observing the positive electrode active material of the present embodiment with a scanning electron microscope.

In addition, in the positive electrode active material of the present embodiment, as described above, the proportion of segregated particles in which a compound containing tungsten and lithium is disposed on the surface of the particles of the lithium-nickel composite oxide more than other composite particles is preferably 0.1% or less and more preferably 0.01% or less by number ratio. If the proportion of segregated particles among a plurality of composite particles is 0.1% or less, the cycle characteristics can be increased and the positive electrode resistance can be suppressed.

Among a plurality of composite particles, the lower limit value of the proportion of the segregated particles is not particularly limited, but segregated particles are preferably absent. Therefore, the lower limit is preferable 0% or more.

The method of calculating the proportion of the segregated particles among the plurality of composite particles of the positive electrode active material of the present embodiment is not particularly limited. However, for example, the proportion of the segregated particles among the composite particles in the obtained plurality of fields can be calculated by observing the positive electrode active material at a magnification of 10 times or more and 1000 times or less, at 3 to 20 field of view, for example, by using a scanning electron microscope. The observation conditions of the scanning electron microscope are not particularly limited, but for example, the acceleration voltage is preferably 1 kV or more and 20 kV or less.

The evenness of the compounds containing tungsten and lithium in the resulting composite particles can also be evaluated and confirmed, for example, by variations in tungsten content when the composite particles are sampled from the positive electrode active material several times to analyze the tungsten content.

In addition, the ratio of the number of tungsten atoms of contained in the compound containing tungsten and lithium (hereinafter, also referred to as the "amount of tungsten") to the total number of nickel and element M atoms contained in the lithium-nickel composite oxide is preferably 0.05 at. % or more and 3.00 at. % or less, more preferably 0.05 at. % or more and 2.00 at. % or less, further preferably 0.10 at. % or more and 1.00 at. % or less, and particularly preferably 0.10 at. % or more and 0.50 at. % or less. When the amount of tungsten to the above-described range is used, both a high charge-discharge capacity and an output characteristic when the positive electrode active material is used as the positive electrode material of a lithium ion secondary battery.

In the positive electrode active material of the present embodiment, for example, tungsten is derived from a compound containing tungsten and lithium disposed on the particle surface of a lithium-nickel composite oxide, and nickel and element M are derived from a lithium-nickel composite oxide. Thus, with respect to the amount of tungsten described above, in other words, the ratio of the number of tungsten atoms to the total number of nickel and element M atoms contained in the positive electrode active material of the present embodiment is preferable 0.05 at. % or more and 3.00 at. % or less, as described above.

The amount of aforementioned tungsten is preferably 0.05 at. % or more, thereby the output characteristics can be particularly increased.

In addition, the generation of the segregated particles can be particularly suppressed when the amount of tungsten described above is 3.00 at. % or less. When the amount of tungsten is 3.00 at. % or less, the lithium conductivity between the lithium-nickel composite oxide and the electrolyte can be increased and the charge-discharge capacity can be increased.

The form of the compound containing tungsten and lithium disposed on the surface of lithium-nickel composite oxide particles is not particularly limited. However, if the surface of the particles of the lithium-nickel composite oxide is covered with a layered material which is a thick film of a compound containing tungsten and lithium, a thick film of the particle boundary of the lithium-nickel composite oxide is filled, and a decrease in specific surface area may occur. In addition, when a thick layered material which is a compound containing tungsten and lithium is formed, such compound containing tungsten and lithium may be concentrated on the particle surface of a particular lithium-nickel composite oxide, and the thick layered material may not be formed on the particle surface of many other lithium-nickel composite oxides. Therefore, the contact area between the lithium-nickel composite oxide and the electrolyte via the compound containing tungsten and lithium may be reduced.

Accordingly, in order to obtain much higher effects, the compound containing tungsten and lithium is preferably present on the surface of particles of the lithium-nickel composite oxide as particles with a particle size of 1 nm or more and 300 nm or less.

When the particle size of the compound containing tungsten and lithium is set to 1 nm or more, particularly sufficient lithium ion conductivity can be exerted. Further, when the particle size of the compound containing tungsten and lithium is set to 300 nm or less, particles of the compound containing tungsten and lithium can be particularly uniformly formed on the surface of the particles of the lithium-nickel composite oxide, and the reaction resistance can be particularly reduced.

When the form described above is adapted, particles of the compound containing tungsten and lithium can effectively enhance lithium ion conductivity with sufficient contact area with the electrolyte. Therefore, particularly high charge and discharge capacitance can be improved, and more effective reduction of reaction resistance can be achieved.

However, particles of the compound containing tungsten and lithium do not need to all exist as particle size of 1 nm or more and 300 nm or less. For example, it is preferable that 50% or more of the particles of the compound containing tungsten and lithium formed on the particle surface of lithium-nickel composite oxide satisfy the above-described range from the viewpoint of obtaining a particularly high effect.

In contrast, when a thin film of a compound containing tungsten and lithium is coated on the particle surface of a lithium-nickel composite oxide, the conductive path of Li can be formed at the interface with the electrolyte while suppressing the decrease of the specific surface area. Accordingly, the effects such as improving the charging-discharging capacity and reducing the reaction resistance can be obtained. When the surface of primary particles is coated with such a thin film of compound containing tungsten and lithium, the compound containing tungsten and lithium is preferably present on the surface of the primary particles of the lithium-nickel composite oxide as a coating having a film thickness of 1 nm or more and 200 nm or less.

When the thickness of the thin film of the compound containing tungsten and lithium is set to 1 nm or more, the thin film can have particularly sufficient lithium ion conductivity. In addition, when the thickness of the thin film of the compound containing tungsten and lithium is set to 200 nm or less, the conductivity of lithium ion can be particularly increased and the reaction resistance can be particularly reduced.

The thin film of compound containing tungsten and lithium does not need to be formed throughout the particles of the lithium-nickel composite oxide. For example, the thin film may be partially formed on the surface of the particles of the lithium-nickel composite oxide, and the range of film thickness of all films may not be 1 nm or more and 200 nm or less. If the thin film of the compound containing tungsten and lithium having a film thickness of at least partially 1 nm or more and 200 nm or less is formed on the surface of the primary particles, the aforementioned high effects can be obtained. For example, when a compound containing tungsten and lithium is formed as a coating, by controlling the amount of tungsten contained in the compound to the above-described range, a coating having a thickness of 1 nm or more and 200 nm or less in which the thickness is sufficient to obtain an effect can be formed.

In addition, even when a compound containing tungsten and lithium is formed on the particle surface of the lithium-nickel composite oxide in which the form of particle and the form of thin film are mixed, a high effect on the battery characteristics can be obtained.

In addition, although the total amount of lithium in the positive electrode active material is not particularly limited, but the ratio "Li/Me ratio" of the number of lithium (Li) atom to the total number of atoms (Me) of nickel and the element M in the positive electrode active material is preferably 0.95 or more and 1.20 or less, and more preferably 0.97 or more and 1.15 or less.

By setting the ratio of the Li/Me to 0.95 or more, when the obtained positive electrode active material is used as a material for the positive electrode of a lithium ion secondary battery, the reaction resistance of the positive electrode is particularly suppressed, thereby increasing the output of the battery. In addition, when the ratio of Li/Me is set to 1.20 or less, the excess lithium component on the particle surface of the lithium-nickel composite oxide can be suppressed. Therefore, when the positive electrode active material is used as a material for the positive electrode of the lithium ion secondary battery, the initial discharge capacity can be particularly increased, and the reaction resistance of the positive electrode can be suppressed.

The lithium content contained in the compound containing tungsten and lithium is supplied from the lithium-nickel composite oxide as a base material, the total amount of lithium in the positive electrode active material does not change before and after the formation of the compound containing tungsten and lithium.

That is, after the formation of the compound containing tungsten and lithium, the ratio of Li/Me of the lithium-nickel composite oxide particles as the base material (core material) is reduced compared to before the formation. Therefore, by setting the ratio of Li/Me to 0.97 or more, a better charge-discharge capacity and a reaction resistance can be obtained.

Accordingly, the ratio of Li/Me of the entire positive electrode active material is preferably 0.97 or more and 1.15 or less.

The powder characteristic of the positive electrode active material of the present embodiment is not particularly limited, but for example, the specific surface area is preferably 0.65 $m^2$/g or higher and 1.30 $m^2$/g or lower. By setting the specific surface area within the above range, when the positive electrode active material is used as a material for the positive electrode of a lithium ion secondary battery, the initial discharge capacity can be enhanced in particular, and the reaction resistance of the positive electrode can be suppressed.

The positive electrode active material of the present embodiment provides a compound containing tungsten and lithium on the surface of the secondary particles and the surface of the primary particles of the lithium-nickel composite oxide particles to improve the output characteristics and the cycle characteristics. The powder characteristics, such as the particle size and the tap density, as the positive electrode active material are not particularly limited. For example, the powder characteristics may be within the range of the normally used positive electrode active material.

In addition, the effects of providing a compound containing tungsten and lithium on the surface of the secondary particles and the surface of the primary particles of the lithium-nickel composite oxide are applicable to powders such as, for example, a lithium-cobalt-based composite oxide, a lithium-manganese-based composite oxide, a lithium-nickel-cobalt-manganese-based composite oxide, and the like. Furthermore, the effects can also applicable to not only the positive electrode active material disclosed in the present invention but also the positive electrode active material for lithium secondary batteries commonly used.

[Li Ion Secondary Battery]

A lithium ion secondary battery in accordance with the present embodiment (hereinafter referred to as "secondary battery") can have a positive electrode that includes the aforementioned positive electrode active material.

Hereinafter, an example of a secondary battery according to the present embodiment will be described for each component. The secondary battery in the present embodiment includes, for example, a positive electrode, a negative electrode, and a non-aqueous electrolyte, and is configured by the same components as a general lithium ion secondary battery. It should be noted that the embodiments described below are merely exemplary, and the lithium ion secondary battery of the present embodiment can be implemented in various modified and improved forms based on the knowledge of a person skilled in the art, including the following embodiments. In addition, the secondary battery is not particularly limited with respect to uses thereof.

(Positive Electrode)

The positive electrode of the secondary battery in the present embodiment can include the positive electrode active material described above.

An example of a manufacturing method of the positive electrode will be described below. First, the aforementioned positive electrode active material (in powder form), a conductive material, and a binding agent (binder) can be mixed to form a positive electrode mixture. If necessary, activated carbon or a solvent for adjusting the viscosity can be added to the positive electrode mixture, and followed by kneading to prepare a positive electrode mixture paste.

The mixing ratio of each material in the positive electrode mixture is a determinant of the performance of the lithium secondary battery. Therefore, the mixing ratio can be adjusted depending on the application. The mixing ratio of the materials may be the same as that of a known lithium ion secondary battery. For example, when the total mass of solids of the positive electrode mixture without solvent is 100% by mass, the positive electrode active material may contain 60% by mass or more and 95% by mass or less, the conductive material may contain 1% by mass or more and 20% by mass or less, and the binder may contain 1% by mass or more and 20% by mass or less.

The resulting positive electrode mixture paste is coated, for example, to a surface of an aluminum foil current collector, dried to evaporate solvent, and a sheet-like positive electrode is prepared. If necessary, pressure may be applied by roll press or the like to increase electrode density. The sheet-like positive electrode obtained in this way can be cut to a suitable size depending on a desired battery to be used. Accordingly, the sheet-like positive electrode can be used for producing a battery.

As the conductive material, for example, graphite (natural graphite, artificial graphite, expanded graphite, and the like) or carbon black-based material such as acetylene black or Ketchen Black (Registered Trademark), or the like can be used.

The binder serves to anchor the active material particles. One or more of binders selected from polyvinylidene fluoride (PVDF), polytetrafluoroethylene (PTFE), fluorine rubber, ethylene propylene diene rubber, styrene butadiene, cellulose-based resins, polyacrylic acid, or the like can be used.

If necessary, a solvent to disperse the positive electrode active material and the conductive material, and a solvent to dissolve the binding agent are added to the positive electrode mixture. For example, an organic solvent such as N-methyl-2-pyrrolidone may be used as the solvent. An activated carbon can also be added to the positive electrode mixture to increase the electrical double layer capacity.

The method of manufacturing positive electrode is not limited to the example described above, but the positive electrode may be manufactured by other methods. For example, the positive electrode mixture may be press molded and then dried under vacuum.

(Negative Electrode)

The negative electrode may be a lithium metal, a lithium alloy, or the like. The negative electrode may be formed by mixing a negative electrode active material capable of intercalating and de-intercalating lithium ions with a binder agent, and further adding an appropriate solvent to the mixture so as to form a paste-like negative electrode mixture, then, the paste-like negative electrode mixture is coated to the surface of a metal foil current collector such as copper, and the resultant is subjected to be dried. The negative electrode may be compressed to increase the electrode density as needed.

As for the negative electrode active material, for example, an organic compound fired body such as natural graphite, artificial graphite, phenolic resins, and the like; and powders of carbon materials such as coke and the like can be used. In this case, a fluorine-containing resin such as PVDF may be used as the negative electrode binder in the same manner as the positive electrode. An organic solvent such as N-methyl-2-pyrrolidone may be used as the solvent for dispersing the active material and the binding agent.

(Separator)

A separator can be sandwiched between the positive and negative electrodes as needed. The separator separates the positive electrode from the negative electrode and retains the electrolyte. A conventional separator can be used, for example, the separator may be a thin-film, such as polyethylene or polypropylene having a number of microscopic pores.

(Non-Aqueous Electrolyte)

Examples of non-aqueous electrolyte include a non-aqueous electrolytic solution.

As the non-aqueous electrolytic solution, for example, a solution in which a lithium salt as a supporting salt is dissolved in an organic solvent, may be used. As the non-aqueous electrolytic solution, the solution in which a lithium salt is dissolved in an ionic liquid, may be used. The ionic liquid is a salt that includes cations and anions other than lithium ions and is the liquid even at room temperature.

The organic solvent may be a solvent selected from the group consisting of cyclic carbonates such as ethylene carbonate, propylene carbonate, butylene carbonate, trifluoropropylene carbonate, and the like; a chain-like carbonate such as diethyl carbonate, dimethyl carbonate, ethyl methyl carbonate, dipropyl carbonate, and the like; an ether compound such as tetrahydrofuran, 2-methyl tetrahydrofuran, dimethoxyethane, and the like; a sulfur compound such as ethyl methyl sulfone, butanesultone, and the like; a phosphorus compound such as triethyl phosphate, trioctyl phosphate, and the like; may be used alone. The organic solvent used may also be a mixture of two or more organic solvents.

As the supporting salt, $LiPF_6$, $LiBF_4$, $LiClO_4$, $LiAsF_6$, $LiN(CF_3SO_2)_2$, and their composite salts may be used. In addition, the non-aqueous electrolytic solution may contain radical scavengers, surfactants, flame retardants, and the like.

As the non-aqueous electrolyte, a solid electrolyte may be used. Solid electrolytes have the property to withstand high voltages. Examples of the solid electrolyte include inorganic solid electrolyte and organic solid electrolyte.

Examples of the inorganic solid electrolyte include an oxide-based solid electrolyte, a sulfide-based solid electrolyte, and the like.

The oxide-based solid electrolyte is not particularly limited. For example, the oxide-based solid electrolyte may preferably contain oxygen (O) and may preferably exhibit a lithium ion conductivity and an electron insulating property. The oxide-based solid electrolyte is one or more kinds selected from lithium phosphate ($Li_3PO_4$), $Li_3PO_4N_x$, $LiBO_2N_x$, $LiNbO_3$, $LiTaO_3$, $Li_2SiO_3$, $Li_4SiO_4$—$Li_3PO_4$, $Li_4SiO_4$—$Li_3VO_4$, $Li_2O$—$B_2O_3$—$P_2O_5$, $Li_2O$—$SiO_2$, $Li_2O$—$B_2O_3$—$ZnO$, $Li_{1+X}Al_XTi_{2-X}(PO_4)_3 (0 \leq X \leq 1)$, $Li_{1+X}Al_XGe_{2-X}(PO_4)_3 (0 \leq X \leq 1)$, $LiTi_2(PO_4)_3$, $Li_{3X}La_{2/3-X}TiO_3$ $(0 \leq X \leq 2/3)$, $Li_5La_3Ta_2O_{12}$, $Li_7La_3Zr_2O_{12}$, $Li_6BaLa_2Ta_2O_{12}$, $Li_{3.6}Si_{0.6}P_{0.4}O_4$, and the like.

The sulfide-based solid electrolyte is not particularly limited. For example, the sulfide-based solid electrolyte may preferably contain sulfur (S) and may preferably exhibit a lithium ion conductivity and an electron insulating property. For example, the sulfide-based solid electrolyte is one or more kinds selected from $Li_2S$—$P_2S_5$, $Li_2S$—$SiS_2$, $LiI$—$Li_2S$—$SiS_2$, $LiI$—$Li_2S$—$P_2S_5$, $LiI$—$Li_2S$—$B_2S_3$, $Li_3PO_4$—$Li_2S$—$Si_2S$, $Li_3PO_4$—$Li_2S$—$SiS_2$, $LiPO_4$—$Li_2S$—$SiS$, $LiI$—$Li_2S$—$P_2O_5$, and $LiI$—$Li_3PO_4$—$P_2S_5$, and the like.

An inorganic solid electrolyte other than the above may be used. For example, $Li_3N$, $LiI$, $Li_3N$—$LiI$—$LiOH$, or the like may be used.

The organic solid electrolyte is not particularly limited in the case of a polymer compound exhibiting ionic conductivity. For example, polyethylene oxide, polypropylene oxide, copolymers thereof, and the like may be used. The organic solid electrolyte may also contain a supporting salt (lithium salt).

(Shape and Configuration of the Secondary Battery)

The lithium ion secondary battery of the present embodiment described above can be in a variety of shapes, such as cylindrical or laminated shape. In any form, when the secondary battery according to the present embodiment uses a non-aqueous electrolytic solution as a non-aqueous electrolyte, the positive electrode and the negative electrode can be laminated via a separator to form an electrode body. The obtained electrode body is impregnated with the non-aqueous electrolytic solution. Then, between the positive electrode collector and the positive electrode terminal leading to the outside and between the negative electrode collector and the negative electrode terminal leading to the outside is connected with a collector lead or the like, and sealed in a battery case.

As described above, the secondary battery according to the present embodiment is not limited to an embodiment using a non-aqueous electrolytic solution as a non-aqueous electrolyte. The secondary batter of the present embodiment may be, for example, a secondary battery using a solid non-aqueous electrolyte, that is, an all-solid-state battery. In the case of all-solid-state battery, the configuration other than the positive electrode active material can be changed as necessary.

In the secondary battery of the present embodiment, the battery has high capacity and high output because the above-mentioned positive electrode active material is used as the material of the positive electrode.

In particular, when the aforementioned positive electrode active material is used for a lithium ion secondary battery, for example, when the positive electrode active material is used for a positive electrode of 2032-type coin battery, the coin-battery can exhibit a high initial discharge capacity of 200 mAh/g or more, that is, a high capacity and low positive resistance can be obtained. Further, a high output can be obtained. In addition, it can also be said that the secondary battery exhibits high thermal stability and excellent safety.

In addition, the secondary battery of the present embodiment can be used for various applications. Because the secondary battery of the present embodiment can be high capacity and high output, the secondary battery of the present embodiment is suitable, for example, for power supply for compact portable electronic devices (such as notebook personal computers and mobile phone terminals) that require high capacity at all times, and for power supply for electric vehicles that require high output.

In addition, the secondary battery of the present embodiment can be miniaturized and has high output. Therefore, the secondary battery of the present embodiment is suitable as a power supply for an electric vehicle that is constrained by the mounting space. The secondary battery according to the present embodiment can be used not only as a power supply for an electric vehicle driven by purely electrical energy, but also as a power supply for a so-called hybrid vehicle combined with a combustion engine such as a gasoline engine or a diesel engine.

EXAMPLES

Although the present invention will be described in further detail in the following Examples and Comparative Examples, the present invention is not limited in any way by these examples. It should be noted that, each evaluation method of the positive electrode active materials and batteries in Examples and Comparative Examples are as described below.

(Evaluation of Positive Electrode Active Material)
(a) Evaluation of Amount of Tungsten Components of the obtained positive electrode active material were evaluated by ICP optical emission spectroscopy using an ICP optical emission spectrometer (manufactured by Shimadzu Corporation, model: ICPS8100). Then, the amount of tungsten which is the ratio of number of W atoms to the total number of Ni and element M atoms of the positive electrode active material was calculated.

In the obtained positive electrode active materials in each Example and Comparative Example, the amount of tungsten which is the ratio of the number of W atoms to the total number of Ni, Co, and Al atoms were evaluated by using an ICP optical emission spectrometer. As a result, it was confirmed that the amount of tungsten in the positive electrode active material obtained was equal to the ratio of the number of W atoms in the tungsten mixture to the total number of Ni, Co, and Al atoms in the lithium-nickel composite oxide, which was the base material used to the mixing step.

(b) Proportion of Segregated Particles

In order to calculate the proportion of segregated particles contained in the composite particles in the positive electrode active material, a scanning electron microscope was used to image any 10 locations of powders of the positive electrode active material at an applied voltage of 5 kV and a magnification of 100 times. In other words, observations were made in 10 fields. At this time, a scanning electron micrograph, such as that indicated in FIG. 1, is obtained in one field of view. Then, the number of segregated particles, which are white particles indicated in the 10 SEM photographs, was counted, and the proportion of the segregated particles out of the composite particles included in the 10 SEM photographs was measured.

Figure 2:
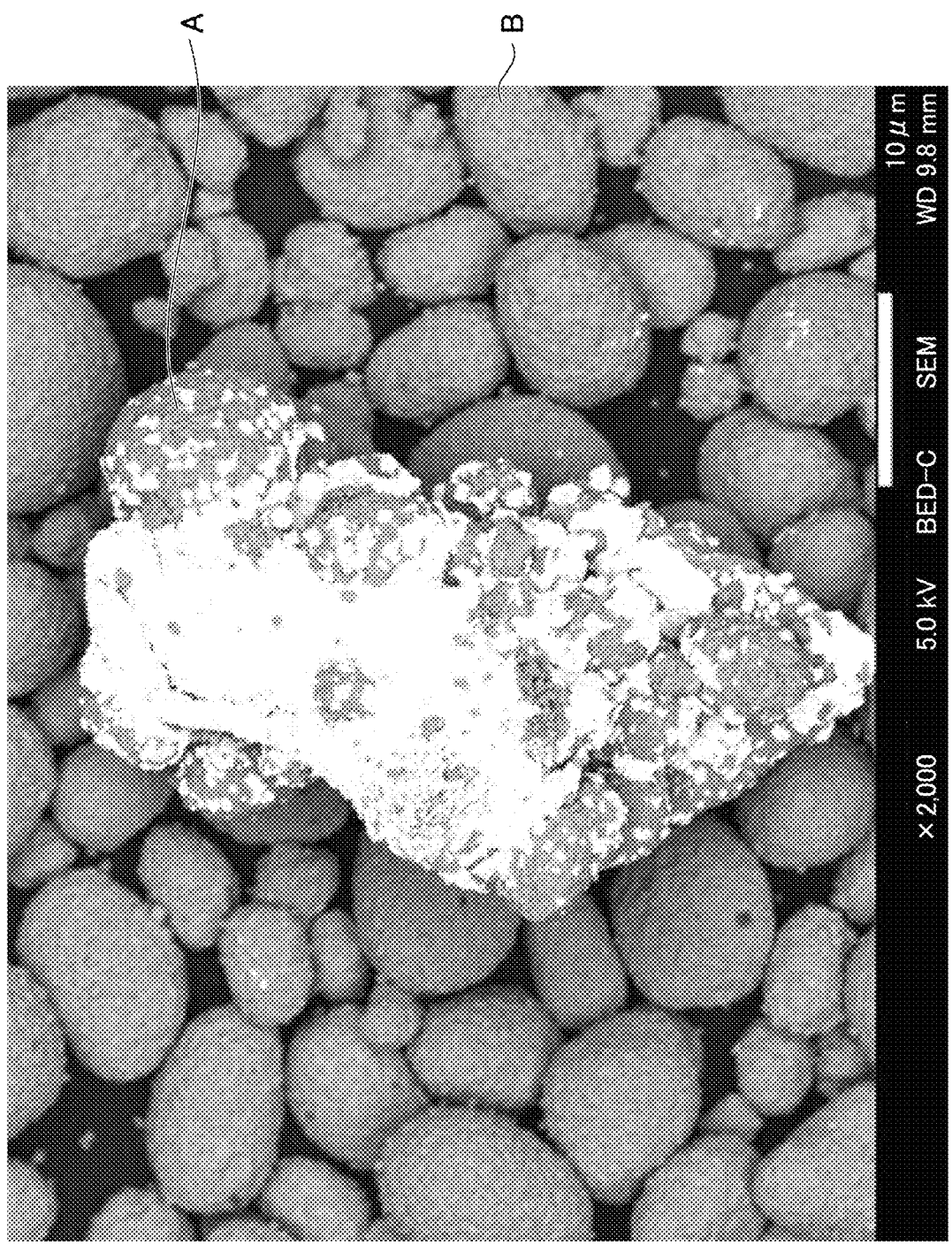
FIG. 2 is an SEM photograph of a segregated particle.
Figure 3:
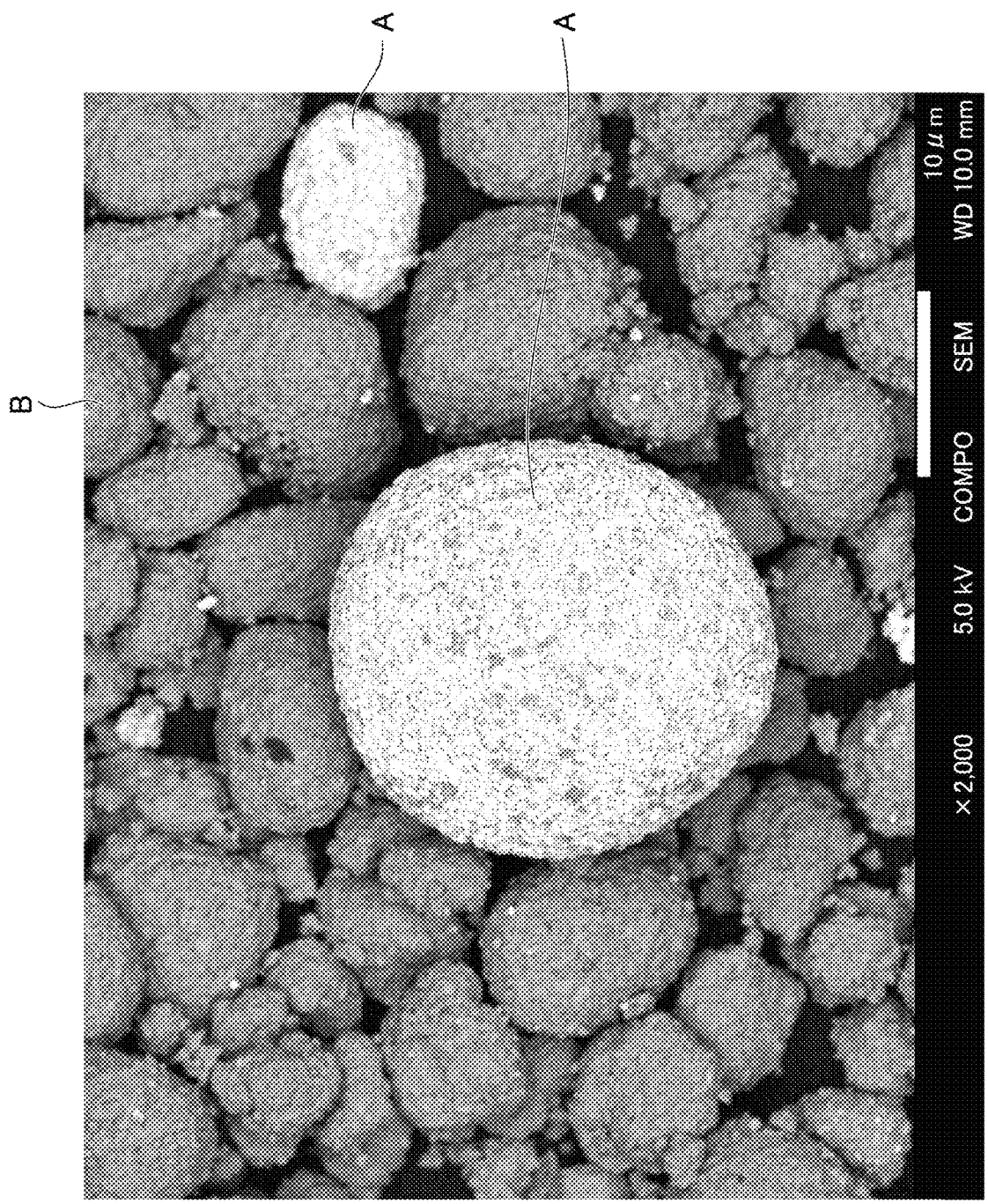
FIG. 3 is an SEM photograph of segregated particles.

As illustrated in FIGS. 2 and 3, segregated particles A can be observed as white particles, while the other composite particles B can be observed as gray particles.

(c) Specific Surface Area

The obtained specific surface area of the positive electrode active material was evaluated by Full Automatic Specific Surface Area Analyzer (manufactured by Mountech Co., Ltd. model: Macsorb HM model-1220).

(Manufacture and Evaluation of Battery)

(a) Manufacturing of Battery

For the evaluation of the positive electrode active material, a 2032-type coin battery 11 (hereinafter referred to as "coin battery") illustrated in FIG. 4 was used.

Figure 4:
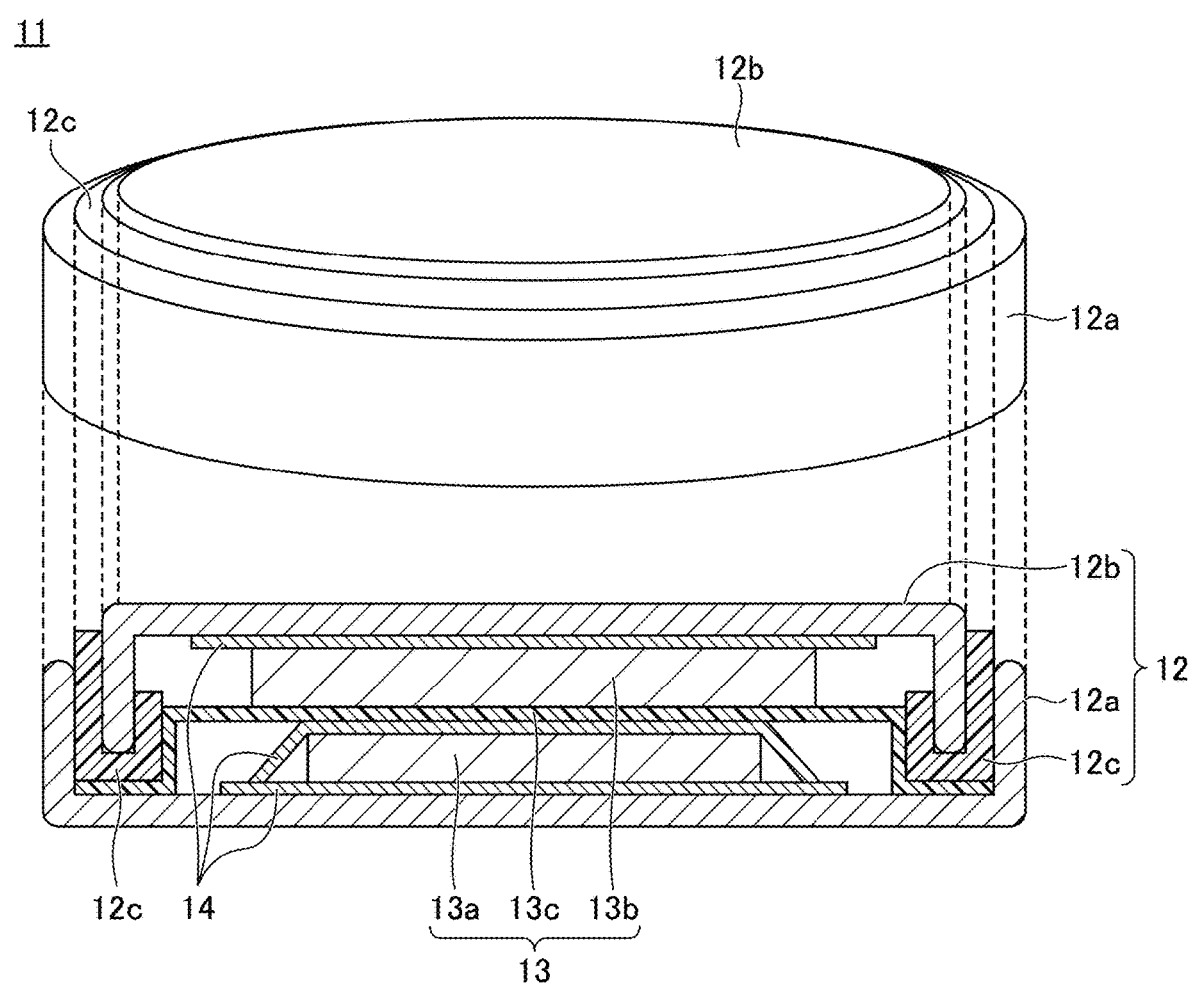
FIG. 4 is an explanatory view illustrating a cross-sectional structure of a coin-type battery prepared in Examples and Comparative Examples.

As illustrated in FIG. 4, the coin-type battery 11 is configured by a case 12 and an electrode 13 contained within the case 12.

The case 12 has a positive electrode can 12a that is hollowed out and has one end open and a negative electrode can 12b that is disposed at the opening of the positive electrode can 12a. When the negative electrode can 12b is disposed at the opening of the positive electrode can 12a, a space to accommodate the electrode 13 is formed between the negative electrode can 12b and the positive electrode can 12a.

The electrode 13 includes of a positive electrode 13a, a separator 13c, and a negative electrode 13b and is laminated in this order. The electrode 13a is housed in the case 12 so that the positive electrode 13a contacts the inner surface of the positive electrode can 12a via a conductor 14, and the negative electrode 13b contacts the inner surface of the negative electrode can 12b via the conductor 14. The conductor 14 is also disposed between the positive electrode 13a and the separator 13c.

The case 12 includes a gasket 12c, which fixes relative movement of the positive electrode can 12a and the negative electrode can 12b so as to maintain the non-contact between the positive electrode can 12a and the negative electrode can 12b. In addition, the gasket 12c also has a function of sealing the gap between the positive electrode can 12a and the negative electrode can 12b to air-tight and liquid-tight the space between the inside of the case 12 and the outside of the case.

The coin-type battery 11 illustrated in FIG. 4 was prepared as follows.

First, 52.5 mg of the positive electrode active material for the lithium ion secondary batteries prepared in each Example and Comparative Example, 15 mg of acetylene black, and 7.5 mg of polytetrafluoroethylene (PTFE) resin were mixed, and the resulting positive electrode mixture was made film-thin with a diameter of 11 mm and a thickness of 100 μm to prepare the positive electrode 13a. The prepared positive electrode 13a was dried in a vacuum dryer at 120° C. for 12 hours.

The coin-type battery 11 was prepared in a glove box under an Ar atmosphere controlled at dew point of −80° C., with use of the positive electrode 13a, the negative electrode 13b, the separator 13c, and the electrolyte solution.

For the negative electrode 13b, a pellet-shaped metal lithium punched into a disk shape with a diameter of 14 mm was used.

A polyethylene porous membrane with a thickness of 25 μm was used for the separator 13c. For the electrolyte solution, a mixture of equal volumes of ethylene carbonate (EC) and diethyl carbonate (DEC) using 1M of $LiClO_4$ as the supporting electrolyte (manufactured by Toyama Chemical Co., Ltd.) was used.

(b) Evaluation

Initial discharge capacity and positive electrode resistance that indicate the performance of the manufactured coin-type battery 11 were evaluated as follows.

(b1) Initial Discharge Capacity

The initial discharge capacity was determined such that the produced coin-type battery was left for about 24 hours. After an open-circuit voltage (OCV) was stabilized, the battery was charged to a cut-off voltage of 4.3 V with a current density of 0.1 $mA/cm^2$ with respect to the positive electrode. After a pause of one hour, the capacity when discharged to a cut-off voltage of 3.0 V was determined as the initial discharge capacity.

(b2) Positive Electrode Resistance

Figure 5A:
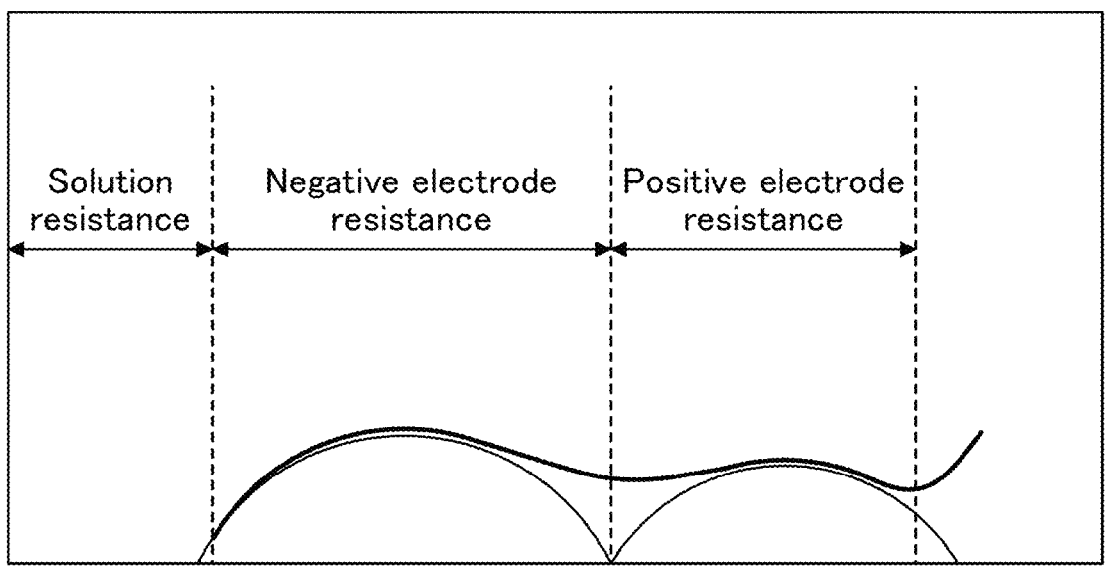
FIG. 5A is a measurement example of an impedance evaluation.

The positive electrode resistance is measured using a frequency response analyzer and potentiogalvanostat (Manufactured by Solatron, 1255B) to charge the coin-type battery 11 at a charge potential of 4.1 V to obtain the Nyquist plot illustrated in FIG. 5A.

The Nyquist plot is expressed as the sum of the characteristic curves indicating the solution resistance, the negative electrode resistance and its capacitance, and the positive electrode resistance and its capacitance.

The battery reaction in the electrode consists of a resistive component of charge transfer and a capacitive component of an electric bilayer. When these are represented by an electric circuit, it represents a parallel circuit of resistance and capacity. As an entire battery, it represents as an equivalent circuit in which a solution resistance, a negative electrode, and a parallel circuit of the positive electrode are connected in series.

Figure 5B:
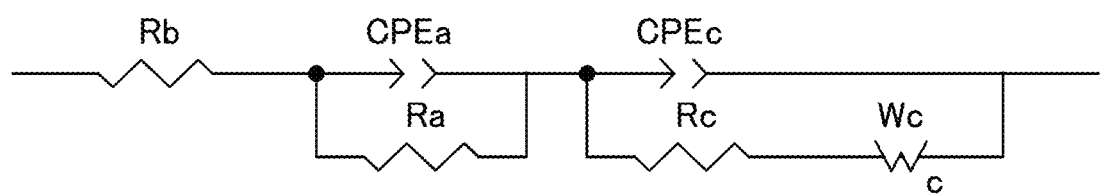
FIG. 5B is a schematic illustration of an equivalent circuit used for analysis.

Therefore, the fitting calculation was performed using the equivalent circuit illustrated in FIG. 5B based on the Nyquist plot illustrated in FIG. 5A, and the value of the positive electrode resistance was calculated.

In the present embodiment, each sample of the special grade reagent manufactured by Wako Pure Chemical Industries, Ltd. was used for the preparation of the positive electrode active material and the secondary battery, unless otherwise specified.

Example 1

The positive electrode active material and the lithium ion secondary battery were manufactured and evaluated according to the following procedures.

(Water-Washing Step)

The powder of lithium-nickel composite oxide which is a layered compound and represented by $Li_{1.025}Ni_{0.91}Co_{0.06}Al_{0.03}O_2$ obtained by known techniques using an oxide having Ni as the main component and a lithium hydroxide, was used as a base material. In the following other examples and comparative examples, the lithium-nickel composite oxide of the layered compound is used as the base material.

Then, 6000 mL of pure water at 25° C. was added to 6000 g of base material to make a slurry, and the slurry was washed by agitating it for 15 minutes. After washing, the solid-liquid mixture was separated by filtration using a filter press. The conductivity of the filtrate obtained after filtration was measured with an SC meter SC72 manufactured by Yokogawa Electric Corporation, and was 56 mS/cm. The water content of the washed cake was 4.5% by mass.
(Mixing Step)

The tungsten oxide ($WO_3$), which is the ratio of the number of tungsten atoms contained in the tungsten mixture to the total number of Ni, Co, and Al atoms in the base material contained in the washed cake, was added to the washed cake so that the amount of tungsten was 0.15 at. %, and the mixture was mixed at 60° C. for 30 minutes to obtain the tungsten mixture.
(Heat Treatment Step)

Thereafter, heat treatment was performed at 200° C. for 120 minutes using a steam tube-type dryer, followed by furnace cooling.

The atmosphere in the mixing step and the heat treatment step was decarboxylated air.

Finally, the tungsten mixture was crushed and sieved through a sieve having a mesh size of 38 μm to obtain a positive electrode active material having particles of lithium tungstate on the surface of the primary particles of the lithium-nickel composite oxide.

The obtained positive electrode active material was subjected to compositional analysis, and the ratio of the amount of tungsten to the total number of Ni and element M atoms was calculated, and it was confirmed that the amount of tungsten in the mixing step is 0.15 at. %. The percentage of segregated particles was also calculated.

The battery characteristics of the coin-type battery 11 illustrated in FIG. 4 having the positive electrode prepared using the resulting positive electrode active material were evaluated. The positive electrode resistance was evaluated by using a relative value of 1.00 based on Example 1.

The test conditions and evaluation results are indicated in Table 1.

Example 2

In the mixing step, the positive electrode active material and secondary battery were prepared and evaluated in the same manner as in Example 1, except that $WO_3$ was added to the washed cake so that the amount of tungsten was 0.05 at. %.

The test conditions and evaluation results are indicated in Table 1.

Example 3

In the mixing step, the positive electrode active material and secondary battery were prepared and evaluated in the same manner as in Example 1, except that $WO_3$ was added to the washed cake so that the amount of tungsten was 0.30 at. %.

The test conditions and evaluation results are indicated in Table 1.

Example 4

The positive electrode active material and secondary battery were prepared and evaluated in the same manner as in Example 1, except that the mixing temperature in the mixing step was changed to 30° C.

The test conditions and evaluation results are indicated in Table 1.

Example 5

The positive electrode active material and secondary battery were prepared and evaluated in the same manner as in Example 1, except that the mixing temperature in the mixing step was changed to 70° C.

The test conditions and evaluation results are indicated in Table 1.

Example 6

The positive electrode active material and secondary battery were prepared and evaluated in the same manner as in Example 1, except that the mixing time in the mixing step was changed to 10 minutes.

The test conditions and evaluation results are indicated in Table 1.

Example 7

The powder of particles of lithium-nickel composite oxide that is a layered compound and represented by $Li_{1.025}Ni_{0.88}Co_{0.09}Al_{0.03}O_2$ obtained by known techniques using an oxide having Ni as the main component and a lithium hydroxide, was used as a base material. Except for the above points, the positive electrode active material and the secondary battery were manufactured and evaluated in the same manner as Example 1.

The test conditions and evaluation results are indicated in Table 1.

Example 8

The powder of particles of lithium-nickel composite oxide that is a layered compound and represented by $Li_{1.025}Ni_{0.82}Co_{0.15}Al_{0.03}O_2$ obtained by known techniques using an oxide having Ni as the main component and a lithium hydroxide, was used as a base material. Except for the above points, the positive electrode active material and the secondary battery were manufactured and evaluated in the same manner as Example 1.

The test conditions and evaluation results are indicated in Table 1.

Comparative Example 1

The positive electrode active material and secondary battery were prepared and evaluated in the same manner as in Example 1, except that the addition of tungsten compound after the washing step was not performed, that is, mixing step was not performed, and the washed cake was used in the heat treatment step.

The test conditions and evaluation results are indicated in Table 1.

Comparative Example 2

In the mixing step, the positive electrode active material and secondary battery were prepared and evaluated in the same manner as in Example 1, except that $WO_3$ was added to the washed cake so that the amount of tungsten was 0.04 at. %.

The test conditions and evaluation results are indicated in Table 1.

Comparative Example 3

The positive electrode active material and secondary battery were prepared and evaluated in the same manner as in Example 1, except that the mixing temperature in the mixing step was changed to 25° C.

The test conditions and evaluation results are indicated in Table 1.

Comparative Example 4

The positive electrode active material and secondary battery were prepared and evaluated in the same manner as in Example 1, except that the mixing temperature in the mixing step was changed to 80° C.

The test conditions and evaluation results are indicated in Table 1.

Comparative Example 5

The positive electrode active material and secondary battery were prepared and evaluated in the same manner as in Example 1, except that the water content of the washed cake obtained after the water-washing step was changed to 2.5% by mass.

The test conditions and evaluation results are indicated in Table 1.

Comparative Example 6

The powder of particles of lithium-nickel composite oxide that is a layered compound and represented by $Li_{0.98}Ni_{0.88}Co_{0.09}Al_{0.03}O_2$ obtained by known techniques using an oxide having Ni as the main component and a lithium hydroxide, was used as a base material. Except for the above points, the positive electrode active material and the secondary battery were manufactured and evaluated in the same manner as Comparative Example 1.

The test conditions and evaluation results are indicated in Table 1.

Comparative Example 7

The powder of lithium-nickel composite oxide particles that is a layered compound and represented by $Li_{0.98}Ni_{0.82}Co_{0.15}Al_{0.03}O_2$ obtained by known techniques using an oxide having Ni as the main component and a lithium hydroxide, was used as a base material. Except for the above points, the positive electrode active material and the secondary battery were manufactured and evaluated in the same manner as Comparative Example 1.

The test conditions and evaluation results are indicated in Table 1.

TABLE 1

| | Water content of washed cake (% by mass) | Amount of tungsten (at. %) | Conditions of mixing step | | Evaluation results | | | |
|---|---|---|---|---|---|---|---|---|
| | | | Mixing temperature (° C.) | Mixing time (min.) | Specific surface area (m²/g) | Positive electrode resistance | Initial discharge capacity (mAh/g) | Proportion of segregated particles (%) |
| Example 1 | 4.5 | 0.15 | 60 | 30 | 0.96 | 1.00 | 210 | 0.054 |
| Example 2 | 4.5 | 0.05 | 60 | 30 | 1.19 | 1.65 | 215 | 0.029 |
| Example 3 | 4.5 | 0.30 | 60 | 30 | 0.69 | 0.95 | 204 | 0.073 |
| Example 4 | 4.5 | 0.15 | 30 | 30 | 1.04 | 1.40 | 214 | 0.088 |
| Example 5 | 4.5 | 0.15 | 70 | 30 | 0.76 | 0.83 | 205 | 0.016 |
| Example 6 | 4.5 | 0.15 | 60 | 10 | 1.09 | 1.13 | 211 | 0.063 |
| Example 7 | 4.5 | 0.15 | 60 | 30 | 1.05 | 0.71 | 212 | 0.055 |
| Example 8 | 4.5 | 0.15 | 60 | 30 | 1.14 | 0.66 | 206 | 0.051 |
| Comparative Example 1 | 4.5 | 0 | — | — | 1.40 | 2.19 | 216 | 0 |
| Comparative Example 2 | 4.5 | 0.04 | 60 | 30 | 1.31 | 2.01 | 215 | 0.021 |
| Comparative Example 3 | 4.5 | 0.15 | 25 | 30 | 1.32 | 1.97 | 214 | 0.095 |
| Comparative Example 4 | 4.5 | 0.15 | 80 | 30 | 0.61 | 1.08 | 198 | 0.005 |
| Comparative Example 5 | 2.5 | 0.15 | 60 | 30 | 1.32 | 1.98 | 202 | 0.140 |
| Comparative Example 6 | 4.5 | 0 | — | — | 1.20 | 1.10 | 208 | 0 |
| Comparative Example 7 | 4.5 | 0 | — | — | 1.25 | 1.05 | 202 | 0 |

As indicated in Table 1, it was confirmed that the secondary battery using the positive electrode active materials of Examples 1 to 6 as the positive electrode material had a sufficiently low positive electrode resistance of 1.70 or less and a sufficiently high initial discharge capacity of 200 mAh/g or more. Therefore, it was confirmed that the positive electrode active materials of Examples 1 to 6 are positive electrode active materials that provide high output as well as high capacity when used in the positive electrode of lithium ion secondary batteries. In addition, in Examples 1 to 6, the desired positive electrode active material could be produced by the water-washing, mixing, and heat treatment steps without requiring sealing in aluminum containers or other operations in the manufacturing step. Therefore, positive electrode active materials with high output as well as high capacity at low cost were obtained.

In contrast, the secondary batteries using the positive electrode active materials of Comparative Examples 1 to 5 as the positive electrode materials had positive electrode resistance exceeding 1.70 or an initial discharge capacity of less than 200 mAh/g, and could not be formed into the secondary batteries with both high capacity and high output.

The specific surface area of the positive electrode active material indirectly indicates the degree to which the lithium tungstate is dispersed on the particle surface, and the more uniformly the lithium tungstate is coated on the primary particles, the smaller the specific surface area tends to be.

Because lithium tungstate itself is a compound with low conductivity, over-covering the positive electrode active material surface tends to reduce the initial discharge capacity of the battery and lower the energy density. However, lithium tungstate has a high ionic conductivity and has the effect of lowering the resistance of the Li intercalation and de-intercalation. Therefore, the positive electrode resistance can be lowered by increasing the amount added or by coating it evenly.

From the results of Examples 1, 4, and 5 and Comparative Examples 3 and 4, it was confirmed that the lower the mixing temperature, the higher the specific surface area tended to be. Especially, it was confirmed that Comparative Example 3, in which the mixing temperature is the lowest at 25° C., has a very high positive electrode resistance of 1.97, and when the mixing temperature in the mixing step was less than 30° C., the reaction and dispersion of the tungsten compound was insufficient, resulting in high positive electrode resistance.

In contrast, when the temperature at the time of mixing was higher than 70° C., the initial discharge capacity became much lower, as indicated in Comparative Example 4.

These results indicate that low resistance and high capacity can be achieved at the same time by setting the mixing temperature in the range of 30° C. or higher and 70° C. or lower.

From the comparison between Examples 1 to 3 and Comparative Examples 1 and 2, the amount of tungsten, which is the ratio of the number of tungsten atoms contained in the tungsten mixture to the total number of nickel and element M atoms contained in the lithium-nickel composite oxide, was 0.05 at. % or more and 3.00 at. % or less. It was confirmed that the addition of the tungsten compound can greatly reduce the positive electrode resistance and maintain a high initial discharge capacity.

Furthermore, from the comparison between Example 1 and Comparative Example 5, it was confirmed that when the water content of the cake was too low (2.5% by mass), the positive electrode resistance became high. This was thought to be because the reaction between the tungsten compound and the lithium component was insufficient, and the formation of the compound containing tungsten and lithium was insufficient.

From the comparison between Examples 1, 7, and 8 and Comparative Examples 1, 6, and 7, it can be seen that even if the ratio of nickel and cobalt in the lithium-nickel composite oxide is changed, the tungsten compound can react and disperse in the same manner, and both low resistance and high capacity can be achieved.

As described above, the method of manufacturing the positive electrode active material for a lithium ion secondary battery, the positive electrode active material for a lithium ion secondary battery, and the lithium ion secondary battery have been described in the embodiments and the examples, but the present invention is not limited to the above-described embodiments and the examples. Various modifications and variations are possible within the scope of the invention as defined in the claims.

This application claims priority under Japanese Patent Office Application No. 2019-029871 filed Feb. 21, 2019, and the entire contents of Patent Application No. 2019-029871 are incorporated by reference herein.

The invention claimed is:

1. A method of manufacturing a positive electrode active material for a lithium ion secondary battery comprising:
a water-washing step of washing a lithium-nickel composite oxide containing lithium (Li), nickel (Ni), and an element M (wherein, the element M is at least one element selected from Mn, V, Mg, Mo, Nb, Ti, Co, and Al) with water, and conducting a filtration to form a washed cake;
a mixing step of mixing, while heating, the washed cake and a tungsten compound without lithium to obtain a tungsten mixture; and
a heat treatment step of heat-treating the tungsten mixture, wherein a water content of the washed cake is 3.0% by mass or more and 10.0% by mass or less,
a ratio of a number of tungsten atoms contained in the tungsten mixture to a total number of nickel and the element M atoms contained in the lithium-nickel composite oxide is 0.05 at. % or more and 3.00 at. % or less,
a temperature of the mixing step is 30° C. or higher and 70° C. or lower, and
a mixing time of the mixing step is 10 minutes or more and 30 minutes or less.

2. The method of manufacturing a positive electrode active material for a lithium ion secondary battery according to claim 1, wherein the lithium-nickel composite oxide is a layered compound which contains lithium (Li), nickel (Ni), and the element M in an amount of substance ratio of Li:Ni:M=y:1−x:x, wherein, $0 \leq x \leq 0.70$, $0.95 \leq y \leq 1.20$.

3. The method of manufacturing a positive electrode active material for a lithium ion secondary battery according to claim 1, wherein washing conditions in the water-washing step are selected such that an electrical conductivity of a filtrate obtained after the filtration is 40 mS/cm or more and 80 mS/cm or less.

4. The method of manufacturing a positive electrode active material for a lithium ion secondary battery according to claim 1, wherein the water content of the washed cake is 4.0% by mass or more and 6.0% by mass or less.

5. The method of manufacturing a positive electrode active material for a lithium ion secondary battery according to claim 1, wherein the tungsten compound without lithium is one or more kinds selected from a tungsten oxide ($WO_3$) and a tungstic acid ($WO_3 \cdot H_2O$).

6. The method of manufacturing a positive electrode active material for a lithium ion secondary battery according to claim 1, wherein the temperature of the mixing step is 30° C. or higher and 60° C. or lower.

7. The method of manufacturing a positive electrode active material for a lithium ion secondary battery according to claim 1, wherein an atmosphere of the heat treatment step is either a decarboxylated dried-air atmosphere or an inert gas atmosphere.

8. The method of manufacturing a positive electrode active material for a lithium ion secondary battery according to claim 1, wherein a heat-treating temperature of the heat treatment step is 100° C. or higher and 200° C. or lower.

* * * * *